US012386286B2

(12) United States Patent
Takagi et al.

(10) Patent No.: US 12,386,286 B2
(45) Date of Patent: Aug. 12, 2025

(54) PRESSING DEVICE AND IMAGE FORMING APPARATUS

(71) Applicants: Hiroaki Takagi, Kanagawa (JP); Takahiro Konishi, Tokyo (JP)

(72) Inventors: Hiroaki Takagi, Kanagawa (JP); Takahiro Konishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/518,601

(22) Filed: Nov. 24, 2023

(65) Prior Publication Data

US 2024/0176263 A1 May 30, 2024

(30) Foreign Application Priority Data

Nov. 28, 2022 (JP) ................................ 2022-189478

(51) Int. Cl.
*G03G 15/08* (2006.01)
*G03G 15/16* (2006.01)
*G03G 21/16* (2006.01)

(52) U.S. Cl.
CPC ....... *G03G 15/1615* (2013.01); *G03G 15/167* (2013.01); *G03G 21/1647* (2013.01); *G03G 2215/1623* (2013.01); *G03G 2221/1642* (2013.01); *G03G 2221/1657* (2013.01)

(58) Field of Classification Search
CPC ............. G03G 15/1615; G03G 15/167; G03G 21/1647
USPC .................................................. 399/302, 308
See application file for complete search history.

(56) References Cited

U.S. PATENT DOCUMENTS 8,515,310 B2 * 8/2013 Nakura .............. G03G 15/0131 399/302
9,141,039 B2 * 9/2015 Kato ................. G03G 15/1605
9,188,910 B2 * 11/2015 Yoshioka ........... G03G 15/1615
9,367,018 B1 6/2016 Yanagawa et al.
9,696,666 B2 * 7/2017 Murayama ......... G03G 15/1615
10,386,781 B2 * 8/2019 Shima .................. G03G 15/161
11,543,762 B2 * 1/2023 Taniguchi ............ G03G 21/168
2010/0232819 A1 9/2010 Kudo et al.
2010/0239282 A1 9/2010 Ashikawa et al.
2011/0110691 A1 5/2011 Hirose et al.
(Continued)

FOREIGN PATENT DOCUMENTS

JP 2016-048364 A 4/2016
JP 2018-031999 A 3/2018
(Continued)

*Primary Examiner* — Hoan H Tran
(74) *Attorney, Agent, or Firm* — XSENSUS LLP

(57) ABSTRACT

A pressing device includes an intermediate transfer unit, a secondary transfer unit, a presser, and a drive transmitter. The intermediate transfer unit transfers and conveys a toner image. The secondary transfer unit faces the intermediate transfer unit to form a nip portion between the secondary transfer unit and the intermediate transfer unit and transfers the toner image onto a conveyed material at the nip portion. The presser applies a pressing force for pressing the secondary transfer unit to the intermediate transfer unit at the nip portion. The drive transmitter transmits the pressing force and a conveyance driving force to a driven transmitter of the secondary transfer unit, is restricted in position by the presser, and is movable together with the presser.

19 Claims, 10 Drawing Sheets

(56) References Cited

U.S. PATENT DOCUMENTS

| | | | |
|---|---|---|---|
| 2012/0190489 | A1 | 7/2012 | Takagi |
| 2013/0071150 | A1 | 3/2013 | Takagi |
| 2014/0147160 | A1 | 5/2014 | Konishi |
| 2015/0043928 | A1 | 2/2015 | Konishi et al. |
| 2015/0050080 | A1 | 2/2015 | Morita et al. |
| 2015/0240879 | A1 | 8/2015 | Takagi et al. |
| 2015/0346651 | A1 | 12/2015 | Nagata et al. |
| 2016/0062300 | A1 | 3/2016 | Takagi et al. |
| 2016/0223977 | A1 | 8/2016 | Yamazaki et al. |
| 2016/0238981 | A1 | 8/2016 | Suido et al. |
| 2017/0010566 | A1 | 1/2017 | Kato et al. |
| 2017/0010576 | A1 | 1/2017 | Takagi et al. |
| 2017/0168429 | A1 | 6/2017 | Imai et al. |
| 2017/0357200 | A1 | 12/2017 | Takagi et al. |
| 2018/0059583 | A1 | 3/2018 | Kumagai et al. |
| 2018/0074455 | A1 | 3/2018 | Takagi |
| 2019/0286017 | A1 | 9/2019 | Nakamoto et al. |
| 2020/0004187 | A1 | 1/2020 | Takagi et al. |
| 2020/0064765 | A1 | 2/2020 | Suga et al. |
| 2020/0133172 | A1 | 4/2020 | Konishi et al. |
| 2020/0174395 | A1 | 6/2020 | Takagi |
| 2020/0326648 | A1 | 10/2020 | Maehata et al. |
| 2020/0379377 | A1* | 12/2020 | Hayakawa ......... G03G 15/1615 |
| 2022/0308517 | A1 | 9/2022 | Takagi |
| 2023/0042229 | A1 | 2/2023 | Nakamura et al. |
| 2023/0090307 | A1 | 3/2023 | Konishi |

FOREIGN PATENT DOCUMENTS

| | | | |
|---|---|---|---|
| JP | 2019-008262 | A | 1/2019 |
| JP | 2021-009192 | A | 1/2021 |

* cited by examiner

PRESSING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-189478, filed on Nov. 28, 2022, in the Japan Patent Office, the entire disclosure of which is hereby incorporated by reference herein.

BACKGROUND

Technical Field

Embodiments of the present disclosure relate to a pressing device and an image forming apparatus.

Related Art

Some technologies have been proposed that an image forming apparatus causes a pressing mechanism to increase pressure between a secondary transfer roller and an intermediate transfer roller facing the secondary transfer roller to transfer toner onto a sheet. In such a pressing mechanism, the position of the secondary transfer nip moves according to the applied pressing force, the secondary transfer unit is driven by a flexible drive train such as a belt.

SUMMARY

In an embodiment of the present disclosure, there is provided a pressing device that includes an intermediate transfer unit, a secondary transfer unit, a presser, and a drive transmitter. The intermediate transfer unit transfers and conveys a toner image. The secondary transfer unit faces the intermediate transfer unit to form a nip portion between the secondary transfer unit and the intermediate transfer unit and transfers the toner image onto a conveyed material at the nip portion. The presser applies a pressing force for pressing the secondary transfer unit to the intermediate transfer unit at the nip portion. The drive transmitter transmits the pressing force and a conveyance driving force to a driven transmitter of the secondary transfer unit, is restricted in position by the presser, and is movable together with the presser.

In another embodiment of the present disclosure, there is provided an image forming apparatus that includes the pressing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
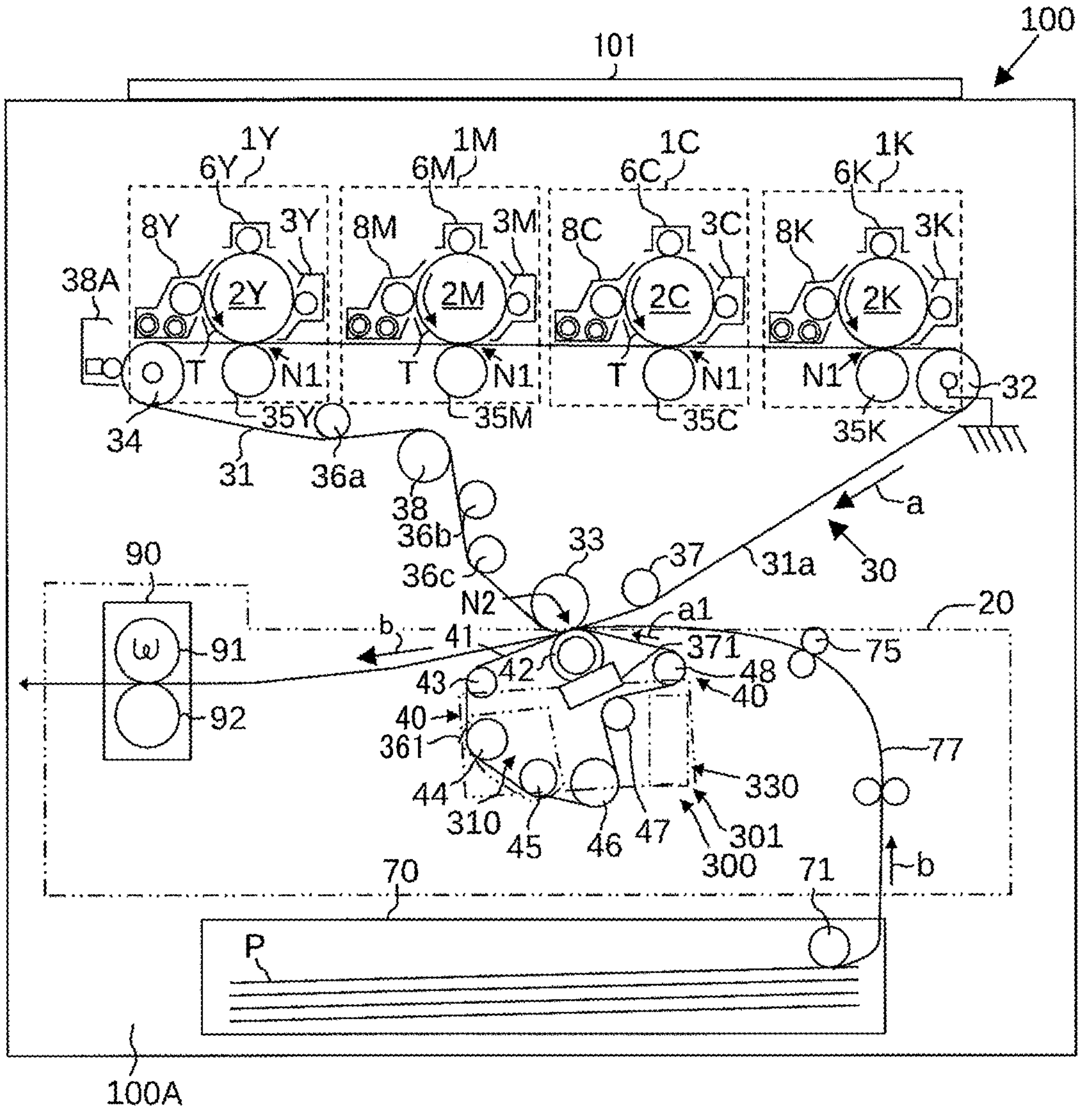
FIG. 1 is a front view of an image forming apparatus including a pressing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In the drawings, Y, M, C, and K are subscripts given to components related to colors of yellow; magenta, cyan, and black, respectively, and are omitted as appropriate.

Figure 2:
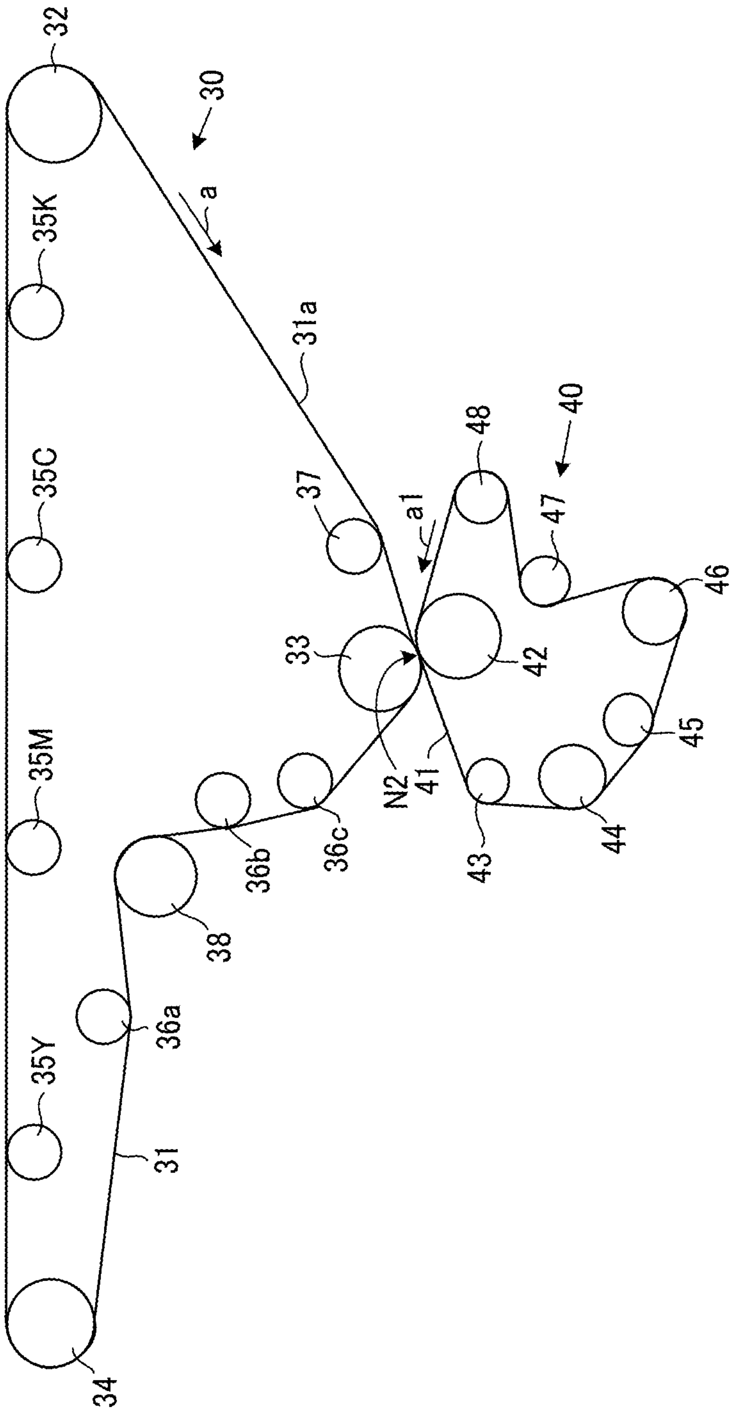
FIG. 2 is a diagram illustrating components of an intermediate transfer unit and a secondary transfer unit disposed in the image forming apparatus of FIG. 1.

Descriptions are given below of an image forming apparatus including a pressing device according to an embodiment of the present disclosure with reference to FIGS. 1 and 2. FIG. 1 is a front view of an image forming apparatus including a pressing device according to an embodiment of the present disclosure. FIG. 2 is a diagram illustrating components of an intermediate transfer unit 30 and a secondary transfer unit 40 disposed in the image forming apparatus of FIG. 1. The image forming apparatus such as an electrophotographic color printer 100 illustrated in FIG. 1 includes four image forming units 1Y, 1M, 1C, and 1K, an intermediate transfer unit 30 as an intermediate transfer device, a secondary transfer device 39 including a secondary transfer unit 40 and a pressing device 300, a sheet tray 70 that stores recording materials P as objects to be conveyed such as sheet-like recording media, and a fixing device 90. In the following description, such an electrophotographic color printer 100 may be referred to simply as a printer 100. Four image forming units 1Y, 1M, 1C, and 1K form toner images in colors of yellow (Y), magenta (M), cyan (C), and black (K), respectively. In the present embodiment, features are given to the pressing device 300 indicated by a long dashed double-dotted line in FIG. 1. A description is given of this part is described in detail after the description of the overall configuration of the printer 100.

Four image forming units 1Y, 1M, 1C, and 1K serving as image forming devices are powder and use Y, M, C, and K toners of different colors as developers, but otherwise have a similar configuration and are replaced when the image forming units reach their lives. In other words, the four image forming units 1Y, 1M, 1C, and 1K are detachably attachable relative to a body 100A of the printer 100 as an image forming apparatus main body to be replaceable.

The image forming units 1Y, 1M, 1C, and 1K include drum-shaped photoconductors 2Y, 2M, 2C, and 2K serving as image bearers, photoconductor cleaners 3Y, 3M, 3C, and 3K, electric-charge removing devices, charging devices 6Y, 6M, 6C, and 6K, and developing devices 8Y, 8M, 8C, and 8K, respectively. The components of each of the image forming units 1Y, 1M, 1C, and 1K are held in a common casing and construct a process cartridge installable in and removable from the body 100A of the printer 100. In other words, each of the image forming units 1Y, 1M, 1C, and 1K is replaceable as a single unit.

The photoconductors 2Y, 2M, 2C, and 2K are driven to rotate counterclockwise in FIG. 1 by a driver such as a motor. Each of the charging devices 6Y, 6M, 6C, and 6K includes a charging roller serving as a charger to which a charging bias is applied. The charging rollers contact or approach the photoconductors 2Y, 2M, 2C, and 2K, respectively, to generate electrical discharges therebetween, thereby charging uniformly the surfaces of the photoconductors 2Y, 2M, 2C, and 2K. Instead of the method in which charging members such as charging rollers are brought into contact with or close to photoconductors 2Y, 2M, 2C, and 2K, a method using corona chargers may be adopted.

The surfaces of the photoconductors 2Y, 2M, 2C, and 2K are uniformly charged by the charging devices 6Y, 6M, 6C, and 6K and are optically scanned by exposure light such as the laser beams emitted from an optical writing unit 101 disposed above the image forming units 1Y, 1M, 1C, and 1K to form electrostatic latent images of yellow; magenta, cyan, and black images. The developing devices 8Y, 8M, 8C, and 8K develop the electrostatic latent images on the photoconductors 2Y, 2M, 2C, and 2K with yellow; magenta, cyan, and black toners, respectively, into visible toner images T. Thus, the toner images T are formed on the photoconductors 2Y, 2M, 2C, and 2K. The toner images T on the photoconductors 2Y, 2M, 2C, and 2K are primarily transferred and borne on a front face 31*a* of an intermediate transfer belt 31 as an endless belt. The photoconductor cleaners 3Y, 3M. 3C, and 3K remove transfer residual toner adhering to the surfaces of the photoconductors 2Y, 2M, 2C, and 2K after a primary transfer process (a primary transfer nip to be described below). The electric-charge removing devices remove residual electric charges remaining on the photoconductors 2Y, 2M, 2C, and 2K after the surfaces thereof are cleaned by the photoconductor cleaners 3Y, 3M, 3C, and 3K. The surfaces of the photoconductors 2Y, 2M, 2C, and 2K are initialized by the discharge devices in preparation for the subsequent imaging cycle.

The intermediate transfer unit 30, which is a primary transfer device and is also referred to as a primary transfer unit, is disposed below the image forming units 1Y, 1M, 1C, and 1K and drives to rotate the intermediate transfer belt 31 clockwise in FIG. 1 while stretching the intermediate transfer belt 31. In the present embodiment, the direction of rotation of the intermediate transfer belt 31 is referred to as a "belt travel direction a" 20) indicated by an arrow a in FIG. 1. The intermediate transfer unit 30 is freely attachable to and detachable from (replaceable with) the body 100A of the printer 100. The intermediate transfer unit 30 includes an intermediate transfer drive roller 32, a secondary-transfer counter roller 33, a cleaning backup roller 34, four primary transfer rollers 35Y, 35M, 35C, and 35K, a tension roller 38, three driven rollers 36*a*, 36*b*, and 36*c*, and a pre-transfer roller 37, in addition to an intermediate transfer belt 31 that is a belt-shaped image bearer and also an intermediate transferor. Among the rollers, the secondary-transfer counter roller 33 is a nip forming member as a pressed body, is placed inside a loop of the intermediate transfer belt 31 that is an endlessly moving transfer member, and is a repulsive roller.

The intermediate transfer belt 31 is looped around, supported by, and stretched between the intermediate transfer drive roller 32, the secondary-transfer counter roller 33, the cleaning backup roller 34, the four primary transfer rollers 35Y, 35M, 35C, and 35K, the driven rollers 36*a*, 36*b*, and 36*c*, and the pre-transfer rollers 37, serving as rotators disposed inside the loop of the intermediate transfer belt 31. The intermediate transfer belt 31 is driven by a driving force by the intermediate transfer drive roller 32, which is driven to rotate clockwise in FIG. 1 by a driver such as a drive motor, moves clockwise as an endless belt, and is conveyed. In the present embodiment, the intermediate transfer belt 31 is an endless elastic belt constructed of a plurality of layers. The intermediate transfer belt 31 serves as the intermediate transferor onto which the toner images are primarily transferred from the photoconductors 2Y, 2M, 2C, and 2K.

The intermediate transfer belt 31 is interposed between the primary transfer rollers 35Y, 35M, 35C, and 35K, and the photoconductors 2Y, 2M, 2C, and 2K, thereby forming primary transfer nips N1 for yellow; magenta, cyan, and black, where the surfaces of the photoconductors 2Y, 2M, 2C, and 2K contact the front face 31*a* or an image bearing face of the intermediate transfer belt 31. Primary transfer biases are applied to the primary transfer rollers 35Y and 35M, the 35C, and the 35K from a known transfer bias power source. Accordingly, transfer electric fields are generated between the primary transfer rollers 35Y, 35M, 35C, and 35K, and the toner images of yellow, magenta, cyan, and black on the photoconductors 2Y, 2M, 2C, and 2K, respectively.

A yellow toner image formed on the photoconductor 2Y enters the primary transfer nip N1 for yellow as the photoconductor 2Y rotates. Subsequently, the yellow toner image is primarily transferred from the photoconductor 2Y to the intermediate transfer belt 31 by the primary transfer electric field and a nip pressure. The intermediate transfer belt 31, on which the yellow toner image has been transferred, passes through the primary transfer nips N1 of magenta, cyan, and black. Then, a magenta toner image, a cyan toner image, and a black toner image are primarily transferred from the photoconductors 2M, 2C, and 2K and sequentially superimposed on the yellow toner image. Accordingly, a composite toner image, in which the toner images of four colors are superimposed, is formed on the intermediate transfer belt 31 in the primary transfer process. The description above concerns full-color image formation to form the composite toner image with four color toners. The configuration is not limited to this. The printer 100 may form a single-color image with one of yellow; magenta, cyan, and black toners and may transfer the single-color image to the intermediate transfer belt 31. Alternatively, the printer 100 may form a multi-color image with at least two of yellow; magenta, cyan, and black toners and may transfer the multi-color image to the intermediate transfer belt 31.

As illustrated in FIG. 2, the belt-type secondary transfer device 39 including the secondary transfer unit 40 including a secondary transfer belt 41 that is a belt member and a transfer member is disposed below an outside of the loop of the intermediate transfer belt 31. In the present embodiment, as illustrated in FIG. 3A to be described below; the secondary transfer device 39 includes a pressure base unit 301 that forms the pressing device 300. The secondary transfer belt 41 is looped around a secondary transfer roller 42, a secondary-transfer drive roller 46, driven rollers 43, 44, 45, and 48, and a tension roller 47, which are multiple rotators. The secondary transfer belt 41 is looped around the outer circumferential surfaces of the above-described rollers and is applied with tension from the outside toward the inside of the secondary transfer belt 41 by the tension roller 47. The secondary transfer belt 41 is rotated and moved in a counterclockwise direction indicated by an arrow al in FIG. 2 by transmission of a driving force from a drive source to be described below to the secondary-transfer drive roller 46. The secondary transfer unit 40 includes a plurality of cleaners, and thus cleaning failure is reduced.

The secondary transfer belt 41 is a polyimide (PI) belt made of a material (for example, a polyimide resin) harder than the intermediate transfer belt 31 made of resin. The secondary transfer unit 40 is attached to the pressing device 300 having a specific configuration. The specific configuration of the pressing device 300 is described below.

The secondary transfer unit 40 nips the intermediate transfer belt 31 between the secondary-transfer counter roller 33 and the secondary transfer belt 41 disposed inside the loop of the intermediate transfer belt 31. The contact portion between the front face 31*a* of the intermediate transfer belt 31 and the secondary transfer belt 41 is referred to as a secondary transfer nip N2. In the present embodiment, a secondary transfer bias is applied to the secondary-transfer counter roller 33 by a known power source as a transfer bias output device. Accordingly, a secondary transfer electric field is generated between the secondary-transfer counter roller 33 and the secondary transfer belt 41. The secondary-transfer electric field electrostatically moves the toner, which has a negative polarity, from the secondary-transfer counter roller 33 toward the secondary transfer belt 41.

In the present embodiment, the toner image on the intermediate transfer belt 31 is transferred onto a recording medium P in the secondary transfer nip N2 serving as a secondary transfer section. The intermediate transfer belt 31 is an image bearer that forms the secondary transfer nip N2 together with the secondary transfer belt 41 that is a conveyor belt. The intermediate transfer belt 31 also serves as the intermediate transferor onto which the toner images are transferred primarily from the photoconductors 2Y, 2M, 2C, and 2K. The toner image transferred onto the secondary transfer belt 41 is a toner image used for image density measurement.

In the present embodiment, a power supply applies a secondary transfer bias to the secondary-transfer counter roller 33. Alternatively, the power supply may apply the secondary transfer bias to the secondary transfer roller 42 serving as a pressing member disposed opposite the secondary-transfer counter roller 33. When the secondary transfer bias is applied to the secondary transfer roller 42, the secondary transfer bias is opposite in polarity to the toner. When the secondary transfer bias is applied to the secondary-transfer counter roller 33, the secondary transfer bias is identical in polarity to the toner. The secondary transfer roller 42 is also referred to as a nip forming roller. In other words, the secondary transfer device 39 is a transfer device in which the secondary transfer roller 42 serving as a nip forming member as a pressed object that contacts the intermediate transfer belt 31 to form the secondary transfer nip N2 can be pressed toward the intermediate transfer belt 31 over the entire width direction orthogonal to the face-moving direction a in the front face 31*a* of the intermediate transfer belt 31 serving as an image bearer that moves on the face thereof.

The sheet tray 70 that is a container to store a bundle of multiple sheets P is disposed below the secondary transfer device 39 in FIG. 1. In the sheet tray 70, a feed roller 71 contacts an uppermost recording medium P of the bundle of recording media. The feed roller 71 is driven to rotate at a specified timing to feed the recording medium P from the sheet tray 70 to a conveyance passage 77 toward the secondary transfer nip N2. A registration roller pair 75 feeds the recording medium P fed in the conveyance passage 77 to the secondary transfer nip N2 at a timing synchronized with the toner image on the front face 31*a* of the intermediate transfer belt 31.

A toner image on the front face 31*a* of the intermediate transfer belt 31 is collectively transferred onto the recording medium P by a secondary-transfer electric field and a nip pressure in the secondary transfer nip N2, thereby forming a full-color toner image in combination with the white color of the recording medium P. After the intermediate transfer belt 31 passes through the secondary transfer nip N2, untransferred residual toner adhere to the front face 31*a* of the intermediate transfer belt 31. The untransferred residual toner is cleaned from the belt face by an intermediate belt cleaner 38A in contact with the front face 31*a* of the intermediate transfer belt 31. The fixing device 90 is disposed downstream from the secondary transfer nip N2 in a recording-medium conveyance direction b. The recording material P on which the toner image is transferred is fed into the fixing device 90. The recording material P fed in the fixing device 90 is nipped in a fixing nip formed between a fixing roller 91 having a heat source therein and a pressing roller 92 in contact with each other, and then the toner in the full-color toner image is softened and fixed by the application of heat and pressure. After the toner image is fixed on the recording material P, the recording material P is ejected from the fixing device 90 and ejected outside of the printer 100.

Figure 3B:
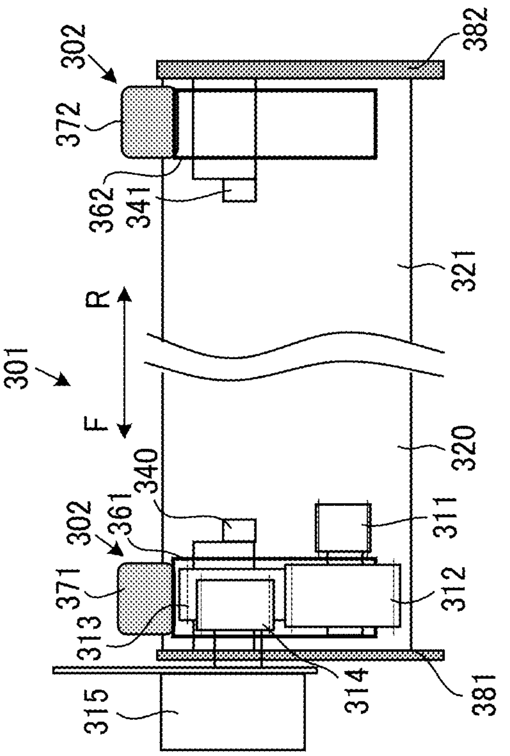
FIG. 3B is an A-A cross-sectional view of a pressure base unit as indicated in FIG. 3A.
Figure 3A:
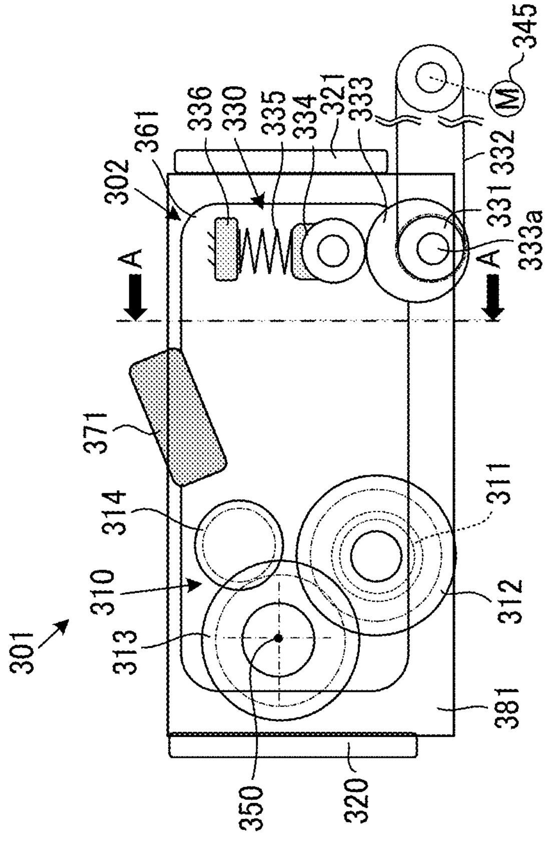
FIG. 3A is a front view of a pressure base unit including a pressing device according to an embodiment of the present disclosure.
Figure 4B:
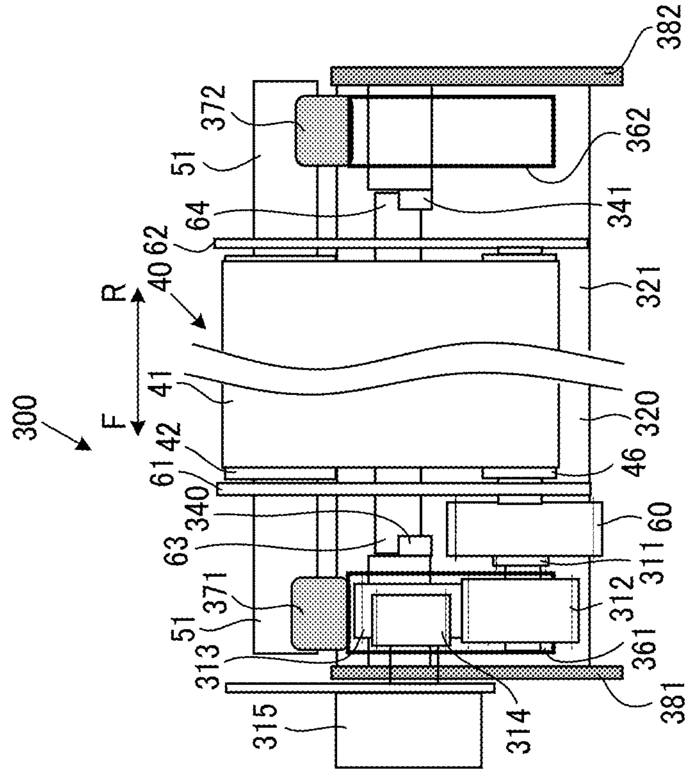
FIG. 4B is a B-B cross-sectional view of a pressing device as indicated in FIG. 4A.
Figure 4A:
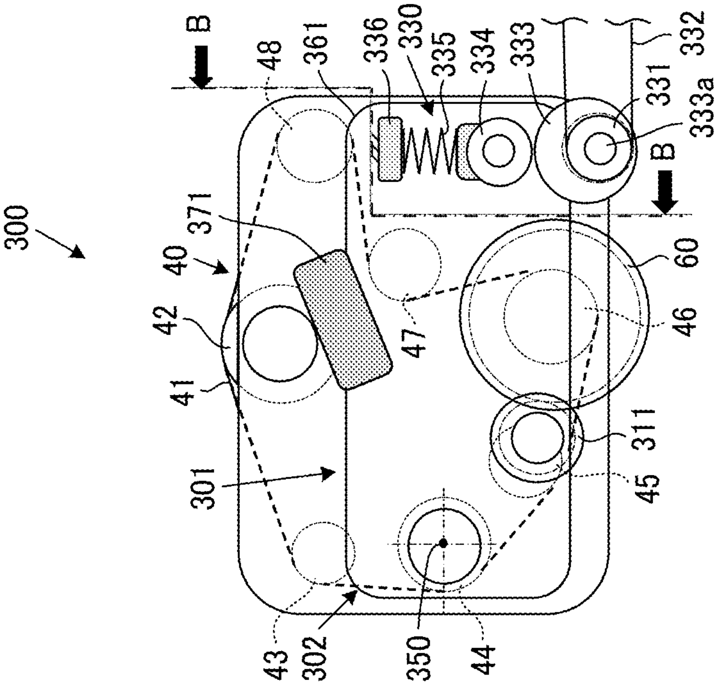
FIG. 4A is a front view of a pressing device illustrating the relative positions of a secondary transfer unit and a pressure base unit, according to an embodiment of the present disclosure.

A description is given of the pressure base unit 301 that forms a pressing device according to an embodiment with reference to FIGS. 1, 3A, 3B, 4A, and 4B. FIG. 3A is a front view of the pressure base unit 301 according to the present embodiment. FIG. 3B is an A-A cross-sectional view of the pressure base unit 301 as indicated in FIG. 3A. FIG. 4A is a front view of a pressing device 300 illustrating the relative positions of the secondary transfer unit 40 and the pressure base unit 301, according to the present embodiment. FIG. 4B is a B-B cross-sectional view of the pressing device 300 as indicated in FIG. 4A. In FIG. 4A, a pressure base left plate 320, a pressure base right plate 321, a pressure front face plate 381, and a pressure rear face plate 382 constitute a pressing section 302 illustrated in FIG. 3A. As illustrated in FIGS. 1, 3A, and 4A, the pressing device 300 of FIG. 1 includes the pressure base unit 301 having a pressure mechanism for pressing the secondary transfer unit 40, and the pressing section 302 serving as a pressing mechanism of the pressure base unit 301 for pressing the secondary transfer unit 40.

As illustrated in FIGS. 3A and 4A, the pressure base unit 301 as a pressing mechanism for pressing the secondary transfer unit 40 includes a pressing-force transmission section 330 as a drive transmitter for transmitting a pressing force to the secondary transfer roller 42. The pressure base unit 301 also includes a conveyance-driving-force transmission section 310 as a drive transmitter that transmits a conveyance driving force to the secondary transfer belt 41 via the secondary-transfer drive roller 46. The pressure base left plate 320 and the pressure base right plate 321 are members that support the pressure front face plate 381 and the pressure rear face plate 382, respectively (the same applies to FIG. 9A to be described below).

The pressing section 302 includes a front pressing lever 361 movably supported by the pressure front face plate 381 and a rear pressing lever 362 movably supported by the pressure rear face plate 382. A front pressing section 371 that forms the pressing-force transmission section 330 and a rear pressing section 372 that forms the pressing-force transmission section 330 are fixed to the front pressing lever 361 and the rear pressing lever 362, respectively. The front pressing section 371 may be integrally formed of the same metal plate as the front pressing lever 361 to ensure needed rigidity. Similarly, the rear pressing section 372 may be integrally formed of the same metal plate as the rear pressing lever 362 to ensure needed rigidity.

A pressing-section front fixing plate 336 of the pressing-force transmission section 330 is positioned and fixed to the front pressing lever 361. A member similar to the pressing-section front fixing plate 336 is also positioned and fixed on the rear pressing lever 362. The pressing-force transmission section 330 having a similar configuration is disposed in the front pressing lever 361 and the rear pressing lever 362. In the following description, a description is given with a simplified member name as a representative of the pressing-force transmission section 330 disposed near the front pressing lever 361. The pressing-force transmission section 330 disposed in each of the front pressing lever 361 and the rear pressing lever 362 includes, for example, a pressing-section front fixing plate 336, a pressing spring 335, a pressing cam follower 334, a pressing cam 333, a pressing cam shaft 333*a*, a pressing-cam-shaft upper pulley 331, and a pressing-cam-drive timing belt 332. The pressing spring 335 is disposed between the pressing-section front fixing plate 336 and the pressing cam follower 334.

In addition to the configuration described above, the pressing-force transmission section 330 is provided with a drive pulley that is disposed on the right side of the pressing-cam-drive timing belt 332 in FIG. 3A, and a cam motor 345 that drives the pressing cam 333 to rotate via the drive pulley, which is schematically illustrated in FIG. 3A. The pressing cam shaft 333*a* that supports the pressing cam 333 is disposed and fixed near the pressure front face plate 381 and the pressure rear face plate 382. The cam motor 345 is fixed to the outside of the pressure base right plate 321. Although illustrated as detached from the pressure base right plate 321 in FIG. 3A for convenience of illustration, in actuality, the cam motor 345 is fixed to the outside of the pressure base right plate 321 and reduces a load when the cam motor 345 rotates with the front pressing lever 361 and the rear pressing lever 362. Peripheral mechanisms including the cam motor 345 are schematically illustrated only in FIG. 3A and are omitted in the drawings below.

As simply surrounded by a rectangular shape with a long dashed double-dotted line in FIG. 1, when, for example, a jam (including replacement of components of the secondary transfer unit 40 and cleaning) occurs in the recording material P fed on a feeding passage above the sheet tray 70 and around the pressing device 300 and the fixing device 90, a layout configuration in which a drawer unit 20 that can be attached to and detached from the body 100A of the printer 100 may be adopted. In the case of such a layout, the cam motor 345 may be fixed to the drawer unit 20. In a case where, for example, a jam (including replacement of components of the secondary transfer unit 40 and cleaning) occurs, when the drawer unit 20 is pulled out from the body 100A of the printer 100 and is inserted into the body 100A of the printer 100 after needed jam processing has ended, the output shafts of the cam motor 345 may be engaged with the drive pulley.

Figure 5A:
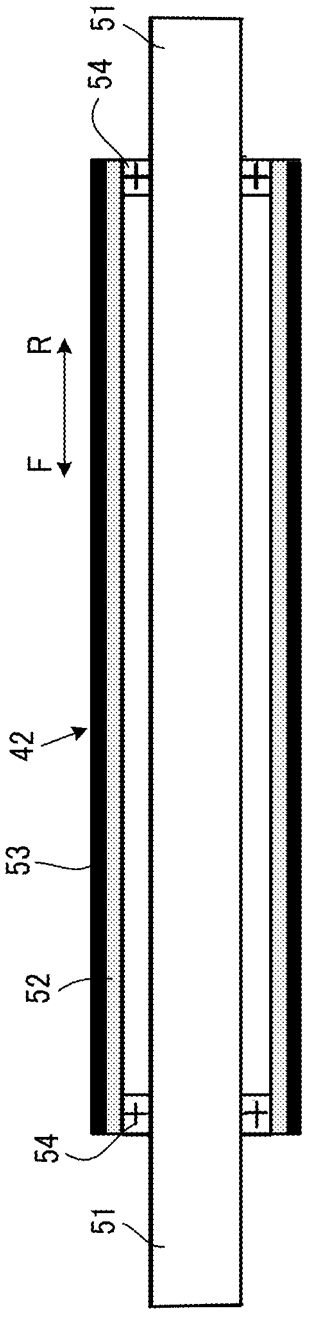
FIG. 5A is a diagram illustrating a configuration in which a secondary transfer roller and a secondary pressure shaft are integrated, according to an embodiment of the present disclosure.
Figure 5B:
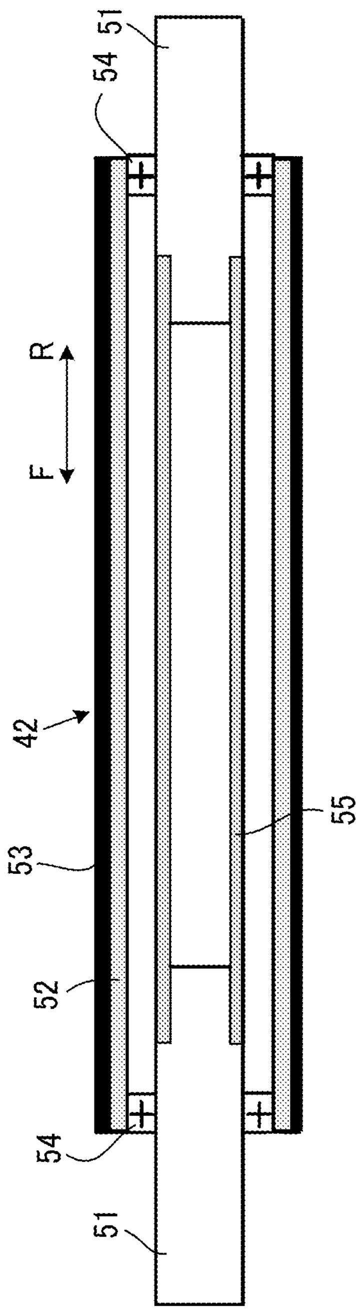
FIG. 5B is a diagram illustrating a configuration in which a secondary-transfer pressure shaft is divided into a front portion and a rear portion and these front and rear portions of the secondary pressure shaft are coupled by pipe material, according to an embodiment of the present disclosure.

As illustrated in FIGS. 5A and 5B to be described in detail below; the front pressing section 371 and the rear pressing section 372 contact and press pressure shafts 51 at the front and rear ends of the secondary transfer roller 42 in positions at which the pressing force is transmitted to the secondary transfer roller 42 by the pressing-force transmission section 330.

The pressing cam 333, whose cam shape is described as a simple eccentric cam having a large diameter portion and a small diameter portion for simplifying the drawing in FIG. 3, has a specific cam configuration (e.g., a multi-stage cam) in which the rotation amount of the cam is controlled so that the pressing force can be controlled for multiple paper types of the recording material P. In actuality, it is needless to say that the pressing force can be changed to several patterns for multiple paper types. When the pressing cam 333 is driven to rotate and the large-diameter portion of the pressing cam 333 and the pressing cam follower 334 come into contact and press with each other, the front pressing section 371 and the rear pressing section 372 are pushed up to apply the greatest pressure to the pressure shaft 51 of the secondary transfer roller 42. In contrast, when the pressing cam 333 is driven to rotate and the small diameter portion of the pressing cam 333 and the pressing cam follower 334 come into contact and press with each other, the front pressing section 371 and the rear pressing section 372 move downward and separate from the pressure shaft 51 of the 20)

secondary transfer roller 42. As a result, the secondary transfer roller 42 can be located at either a position where the secondary transfer roller 42 contacts the secondary transfer belt 41 or a position where the secondary transfer roller 42 is separated from the secondary transfer belt 41.

As illustrated in FIG. 3A, the conveyance-driving-force transmission section 310 includes a secondary-transfer drive gear 311, a gear 312 fixed coaxially with the secondary-transfer drive gear 311 and operated at the same number of rotations, an idler gear 313 meshed with the gear 312, a motor output gear 314 meshed with the idler gear 313, and a secondary-transfer drive motor 315 connected to the motor output gear 314. The gear 312 and the idler gear 313 are axially supported by the front pressing lever 361 to be rotatable via respective gear shafts.

The secondary-transfer drive motor 315 is a drive source that drives to rotate the secondary-transfer drive roller 46 via the conveyance-driving-force transmission section 310, and is fixed to the pressure front face plate 381 that is a place that does not serve as a load for the pressing section 302 as illustrated in FIGS. 3B and 4B. The motor output gear 314 is integrally disposed to an output shaft of the secondary-transfer drive motor 315, and thus does not serve as a load of the pressing section 302 in the same manner as the secondary-transfer drive motor 315.

A secondary-transfer drive coaxial upper gear 60 is disposed coaxially with the secondary-transfer drive roller 46. The secondary-transfer drive gear 311 meshes with the secondary-transfer drive coaxial upper gear 60 disposed coaxially with the secondary-transfer drive roller 46. As a result, a conveyance driving force generated by the rotational driving of the secondary-transfer drive motor 315 is sequentially transmitted from the motor output gear 314, the idler gear 313, the gear 312, the secondary-transfer drive gear 311, and the secondary-transfer drive coaxial upper gear 60 to the secondary-transfer drive roller 46.

As illustrated in FIG. 3B, a secondary-transfer front fixing shaft 340 is disposed at a portion extending from an inner side of the front pressing lever 361 toward a right center in FIG. 3B, and a secondary-transfer rear fixing shaft 341 is disposed at a portion extending from an inner side of the rear pressing lever 362 toward the left center in FIG. 3B. The secondary-transfer front fixing shaft 340 and the secondary-transfer rear fixing shaft 341 are formed in such a manner that the central portions thereof are engaged with each other to form a recess and a protrusion. As illustrated in FIG. 4B, the secondary transfer unit 40 is inserted between the front pressing lever 361 and the rear pressing lever 362, the secondary-transfer front fixing shaft 340 is engaged with a front secondary-transfer-unit reference 63, and the secondary-transfer rear fixing shaft 341 is engaged with a rear secondary-transfer-unit reference 64. As a result, the secondary transfer unit 40 and the pressure base unit 301 are assembled together, and thus positioning of both units in a three-dimensional direction and phase alignment are performed.

A description is given of the cross-sectional configuration of the secondary transfer roller with reference to FIGS. 5A and 5B. The secondary transfer roller 42 illustrated in FIG. 5A has an example configuration in which a secondary-transfer pressure shaft is integrated, and the secondary transfer roller 42 illustrated in FIG. 5B has an example configuration in which the secondary-transfer pressure shaft is divided into a front portion and a rear portion and these front and rear portions of the secondary-transfer pressure shaft are coupled by pipe material. The secondary transfer roller 42 in FIG. 5A includes the pressure shaft 51 for the secondary transfer roller, which extends integrally in the front direction F and the rear (or back) direction R, bearings 54 disposed at two positions of front and rear ends of the pressure shaft 51, a pipe material 52 disposed on the outer circumferential surface of the bearings 54 via the bearings 54 at the front and rear ends, and a surface layer 53 disposed to be fixed to the further circumferential surface of the pipe material 52. The front and rear ends of the pressure shaft 51 protrude further from the front and rear end portions of the bearing 54, the pipe material 52, and the surface layer 53.

The secondary transfer roller 42 in FIG. 5A includes the pressure shaft 51 for the secondary transfer roller, which extends integrally in the front direction F and the rear (or back) direction R, bearings 54 disposed at two positions of front and rear ends of the pressure shaft 51, a pipe material 52 disposed on the outer circumferential surface of the bearings 54 via the bearings 54 at the front and rear ends, and a surface layer 53 disposed to be fixed to the further circumferential surface of the pipe material 52.

By adopting the above-described configurations, when the secondary transfer roller 42 of FIGS. 5A and 5B presses the front and rear ends of the pressure shaft 51, the pressure shaft 51 is prevented from rotating so that the front and rear ends of the pressure shaft 51 can be pressed directly by the front pressing section 371 and the rear pressing section 372 as illustrated in FIGS. 4A and 4B.

As illustrated in FIG. 4A, a pressing force generated by the pressing-force transmission section 330 is transmitted to the front pressing section 371, the rear pressing section 372, and the front and rear ends of the pressure shaft 51 of the secondary transfer roller 42, and thus the front pressing lever 361 and the rear pressing lever 362 rotate (which means to swing within an acute angle range of a specified angle). In the example illustrated in FIG. 4A, a rotation fulcrum 350 of the front pressing section 371 and the rear pressing section 372 and a rotation fulcrum of the secondary transfer unit 40 (an axial center of a driven roller 44) are coaxial with each other.

As illustrated in FIG. 4A, even if a rotation fulcrum is positioned in the front pressing lever 361, a positional relation between the front pressing lever 361 and the secondary transfer unit 40 does not change. Thus, similarly, in that case, the distance and positional relationship between gears of the secondary-transfer drive gear 311 and the secondary-transfer drive coaxial upper gear 60 do not change. In the following description, the rear pressing lever 362 may be omitted for purposes of simplification.

Figure 6B:
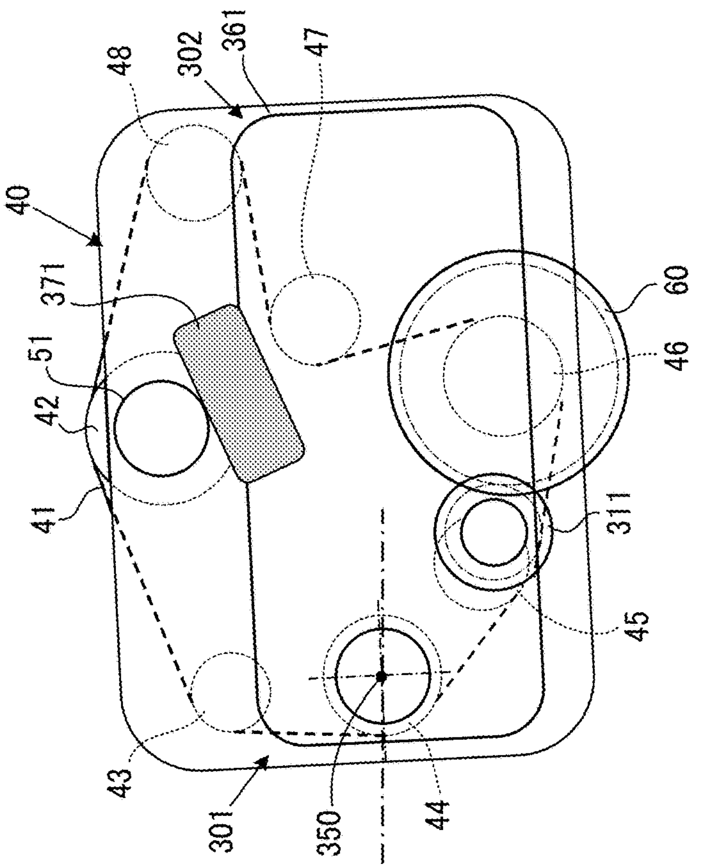
FIG. 6B is a diagram illustrating the positional states of components when a pressing force is large, according to an embodiment of the present disclosure.
Figure 6A:
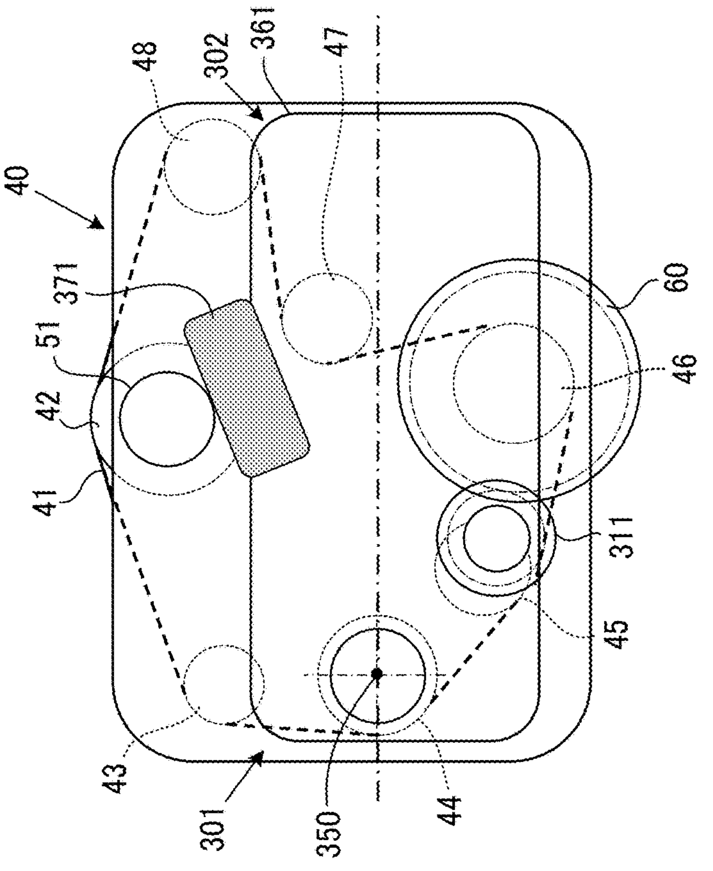
FIG. 6A is a diagram illustrating the positional states of components when a pressing force is small, according to an embodiment of the present disclosure.

FIG. 6A illustrates the positions of components in a pressing state of the front pressing lever 361 and the pressure shaft 51 of the secondary transfer roller 42, and in a meshing state of the secondary-transfer drive gear 311 and the secondary-transfer drive coaxial upper gear 60, in the case where the pressing force is small. FIG. 6B illustrates the positions of components in a pressing state of the front pressing lever 361 and the pressure shaft 51 of the secondary transfer roller 42, and in a meshing state of the secondary-transfer drive gear 311 and the secondary-transfer drive coaxial upper gear 60, in a case where the pressing force is large. Even if the pressing force changes in this way, the distance and positional relation between the secondary-transfer drive gear 311 and the secondary-transfer drive coaxial upper gear 60 do not change. In FIGS. 6A and 6B, the description has been given with respect to the rotation fulcrum 350 in a case where the secondary-transfer front fixing shaft 340 for positioning the secondary transfer unit 40 is located on the same axis of the idler gear 313. Then, it can be seen that the distance and the positional relation between the secondary-transfer drive gear 311 and the secondary-transfer drive coaxial upper gear 60 do not change.

Figure 7A:
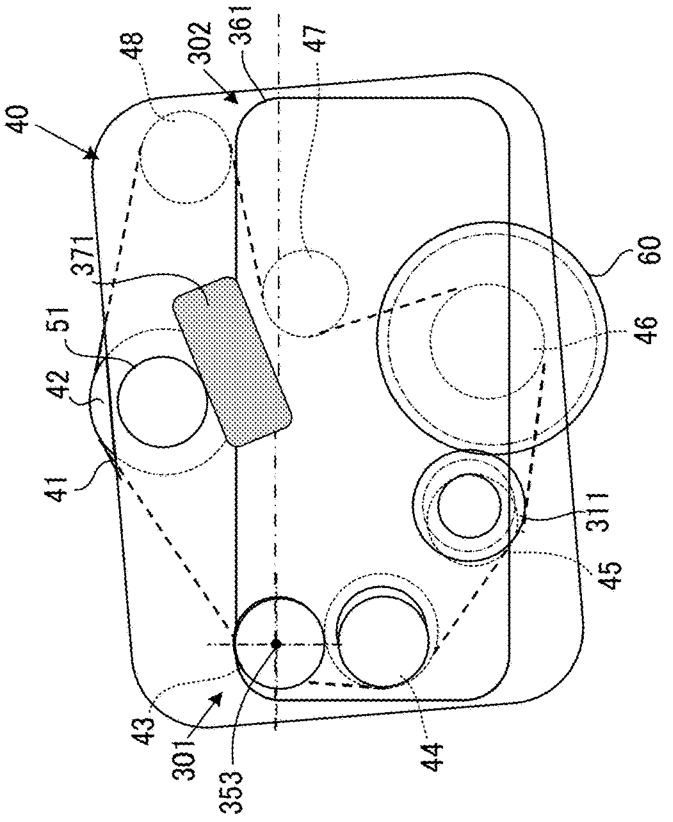
FIG. 7A is a diagram illustrating the positional states of components in a case where a rotation fulcrum of a secondary transfer unit is separately disposed in a front pressing lever when a pressing force is small, according to an embodiment of the present disclosure.
Figure 7B:
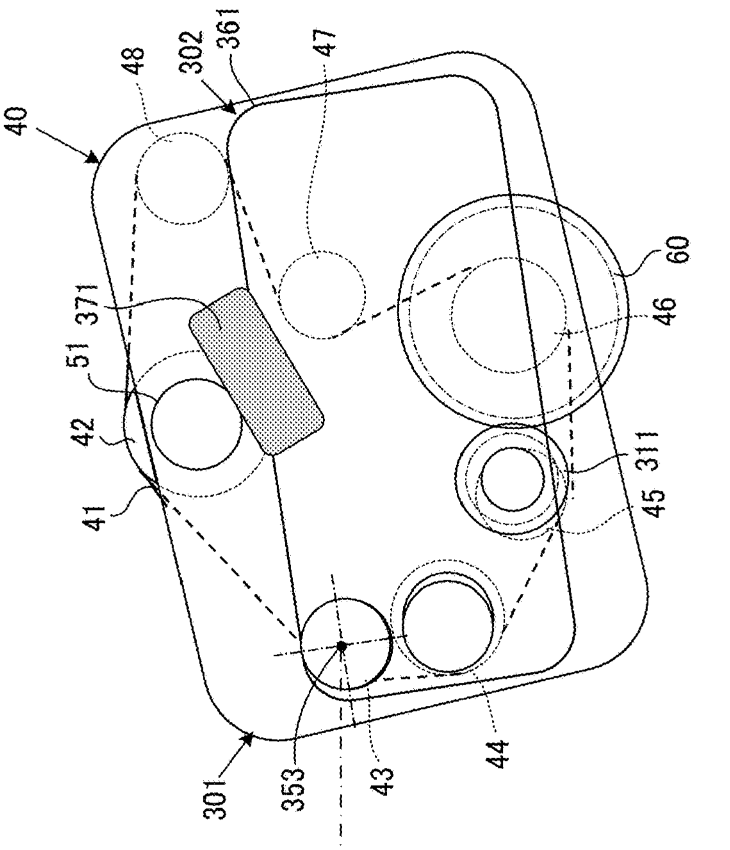
FIG. 7B is a diagram illustrating the positional states of components in a case where a rotation fulcrum of a secondary transfer unit is separately disposed in a front pressing lever when a pressing force is large, according to an embodiment of the present disclosure.

FIGS. 7A and 7B illustrate a case where a rotation fulcrum 353 of the secondary transfer unit 40 is separately disposed in the front pressing lever 361. FIG. 7A illustrates the positional state of components in the case where a pressing force is small, and FIG. 7B illustrates the positional state of components in the case where a pressing force is large. Even in such a case, it can be seen that the distance and the positional relationship between the gears of the secondary-transfer drive gear 311 and the secondary-transfer drive coaxial upper gear 60) do not change.

Figure 8B:
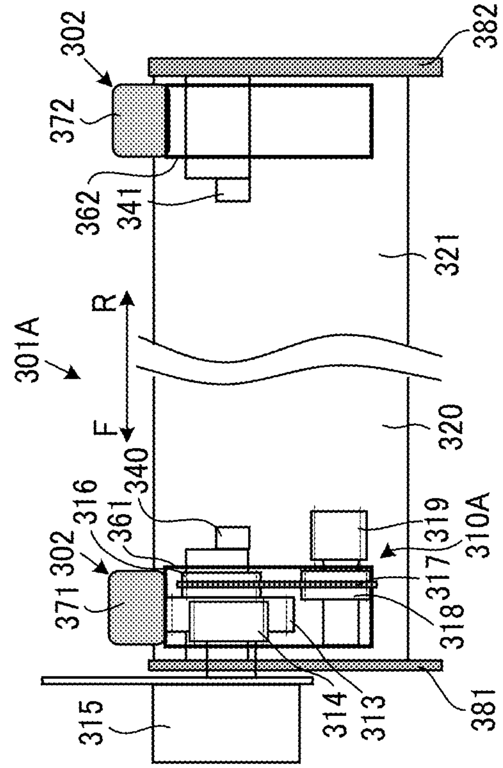
FIG. 8B is an A-A cross-sectional view of a pressure base unit as indicated in FIG. 8.
Figure 8A:
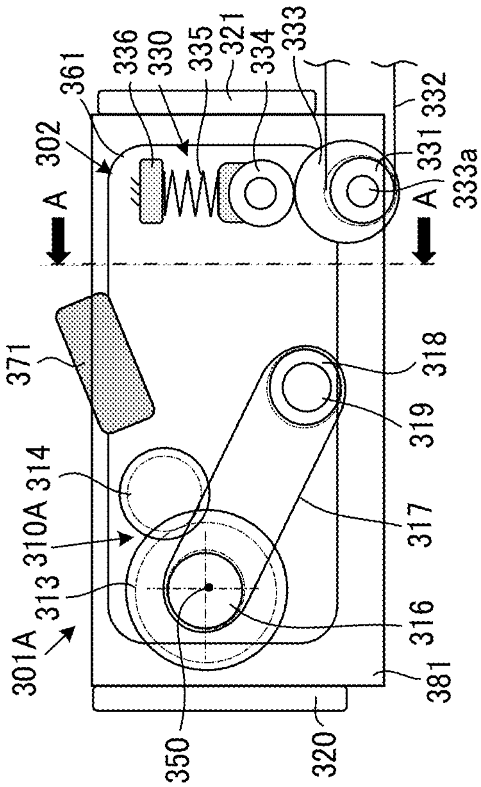
FIG. 8A is a front view of a pressure base unit according to an alternative embodiment of the present disclosure.
Figure 9B:
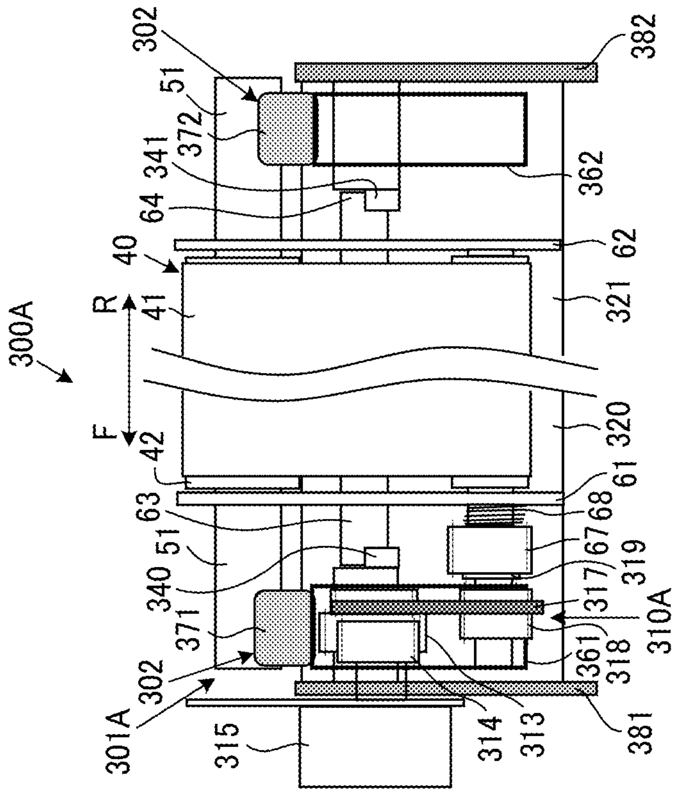
FIG. 9B is a B-B cross-sectional view of a pressing device as indicated in FIG. 9A.
Figure 9A:
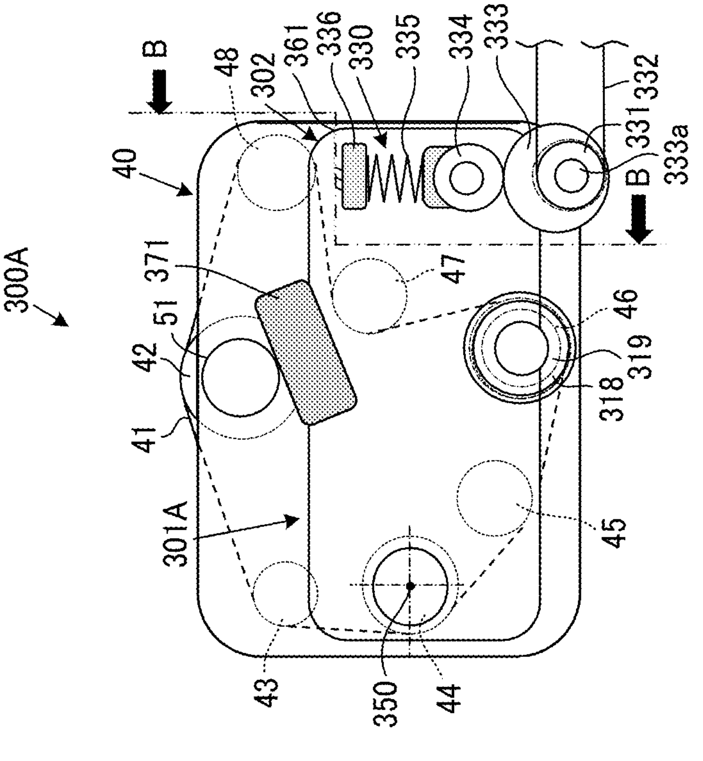
FIG. 9A is a front view of a pressing device 300A illustrating the relative positions of a secondary transfer unit and a pressure base unit, according to an alternative embodiment of the present disclosure.

A description is given of an alternative embodiment different from the embodiments of the present disclosure described with reference to FIGS. 2 to 7B, with reference to FIGS. 8A to 9B. FIG. 8A is a front view of a pressure base unit 301A according to an alternative embodiment of the present disclosure. FIG. 8B is an A-A cross-sectional view of the pressure base unit 301A as indicated in FIG. 8A. FIG. 9A is a front view of a pressing device 300A illustrating the relative positions of the secondary transfer unit 40) and the pressure base unit 301A, according to the present alternative embodiment. FIG. 9B is a B-B cross-sectional view of the pressing device 300A as indicated in FIG. 9A. The pressing device 300A and the pressure base unit 301A illustrated in FIGS. 8A and 9A are different from the pressing device 300 and the pressure base unit 301 illustrated in FIGS. 3A, 3B, 4A, and 4B in that a conveyance-driving-force transmission section 310A formed by attachable and detachable joint engagement is used instead of the conveyance-driving-force transmission section 310.

The conveyance-driving-force transmission section 310A is different from the conveyance-driving-force transmission section 310 in that a drive connection of the secondary transfer unit 40 and the pressure base unit 301 is performed with attachable and detachable joint engagement instead of meshing by gears. As illustrated in FIGS. 8A and 8B, the conveyance-driving-force transmission section 310A includes the idler gear 313, the motor output gear 314, and the secondary-transfer drive motor 315, which are the same members as the conveyance-driving-force transmission section 310. The conveyance-driving-force transmission section 310A is different from the conveyance-driving-force transmission section 310 in that a pressure-base idler gear pulley 316, a pressure-base timing belt 317, a pressure-base drive shaft pulley 318, and a secondary-transfer drive joint 319 are newly disposed instead of the gear 312. The pressure-base idler gear pulley 316 is disposed coaxially with the idler gear 313. The pressure-base timing belt 317 is looped around the pressure-base idler gear pulley 316 and the pressure-base drive shaft pulley 318 to establish a driving force transmission relation therebetween.

The pressure-base drive shaft pulley 318 is disposed to correspond to the secondary-transfer drive roller 46 near the secondary transfer unit 40. The secondary-transfer drive joint 319 is disposed coaxially with the pressure-base drive shaft pulley 318.

As illustrated in FIG. 9B, a secondary-transfer drive joint 67 and a secondary-transfer drive-joint spring 68 are disposed on the left of the secondary-transfer drive roller 46 near the secondary transfer unit 40 in FIG. 9B. The secondary-transfer drive-joint spring 68 is disposed to enhance the engagement between the secondary-transfer drive joint 67 and the secondary-transfer drive joint 319 when the conveyance-driving-force transmission section 310A of the pressing section 302 is assembled to the secondary transfer unit 40. The secondary-transfer drive joint 319 is engaged with the secondary-transfer drive joint 67 to transmit the conveyance driving force when the conveyance-driving-force transmission section 310A of the pressing section 302 is assembled to the secondary transfer unit 40.

It is preferable to use a flexible joint, such as the secondary-transfer driving joint 319 and the secondary-transfer driving joint 67, which is used in a drive transmission device and allows the misalignment of the shaft centers. The joint used in the drive transmission device is a joint in which at least one joint (corresponding to the secondary-transfer drive joint 319 illustrated in FIG. 9B) has a degree of freedom with respect to the rotating shaft, and the other joint is inclined to be a joint provided with a gap with respect to the rotating shaft (corresponding to the other secondary-transfer drive joint 67 illustrated in FIG. 9B).

The fitting and connection by the flexible joints (the secondary-transfer drive joint 67 and the secondary-transfer drive joint 319) as described above does not apply an unnecessary force to the secondary transfer unit 40. Accordingly, there is an advantageous effect that the front-and-rear pressure deviation between the secondary-transfer drive joint 67 and the secondary-transfer drive joint 319 can be reduced. The conveyance-driving-force transmission section 310 based on the meshing of the gears as described above may apply a force to the pressure base unit 301 in response to a change in the load of the secondary transfer unit 40. However, the above-described effect does not occur in the case of joint engagement and connection in the conveyance-driving-force transmission section 310A, and thus it can be said that the mechanism is preferable in this point. In the case where the above-described configuration is adopted for the convenience of layout, it is necessary to avoid joints from each other in assembly, and the pressure base unit 301 is assembled to the secondary transfer unit 40 in the up and down direction, so that some ways for avoiding the joints from each other without any problem. In a case where the force turns to be large enough to generate a gap in the pressing section 302, an abnormal sound may be generated in the pressing section 302.

Similarly, in the pressing device 300A illustrated in FIGS. 9A and 9B, a deviation in the positional relation between the joints (axis deviation) does not change according to the pressure amount, and thus occurrence of the axis deviation by the pressing force to prevent problems such as a front-rear deviation in the pressure amount due to a shaft reaction force.

As described above, according to an embodiment illustrated in FIGS. 2 to 7B and another embodiment illustrated in FIGS. 8A and 9B, a pressing device without an increase in working time and without an increase in service cost can be provided, for example, when a secondary transfer unit is replaced.

Figure 10:
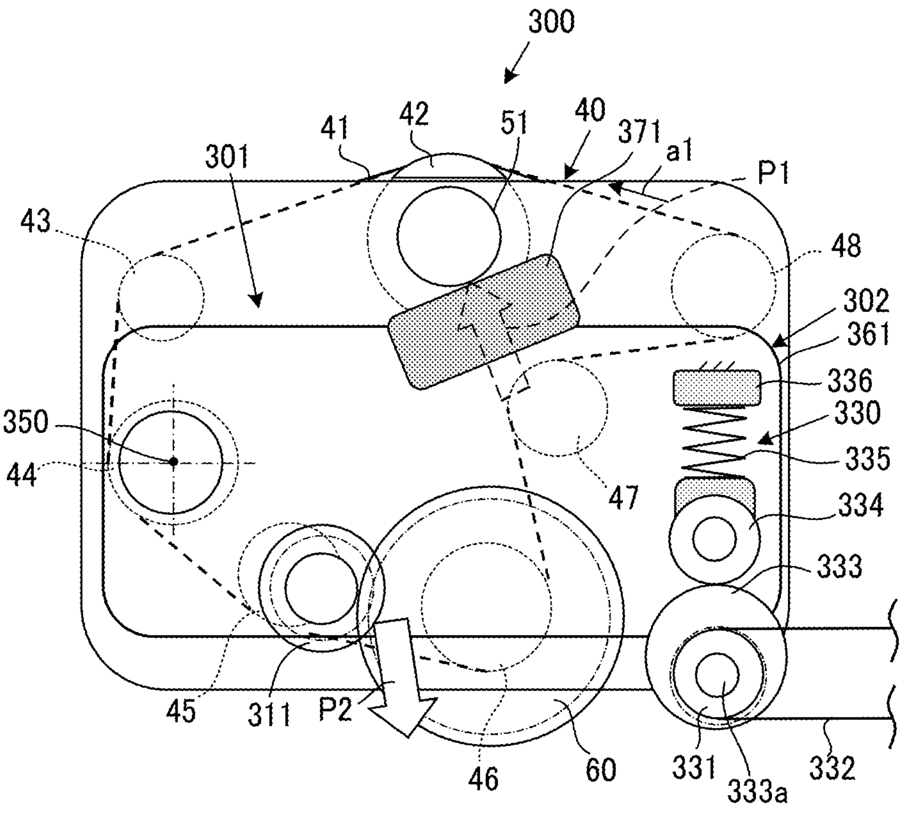
FIG. 10 is a diagram illustrating a case where the direction of a force is determined by the rotation direction in which a secondary transfer belt is driven and the arrangement of gears, according to an embodiment of the present disclosure.

A description is given of a direction in which the secondary transfer unit 40 receives a force from the pressure base unit 301 in an embodiment illustrated in FIGS. 2 to 7B with reference to FIG. 10. FIG. 10 is a diagram illustrating a case where the direction of a force is determined by the rotation direction in which the secondary transfer belt is driven and the arrangement of gears, according to an embodiment of the present disclosure. In the pressing device 300 illustrated in FIGS. 2 to 7B, the direction of a force P2 that the secondary transfer unit 40 receives from the pressing section 302 of the pressure base unit 301 is determined by the rotation direction in which the secondary transfer belt 41 is driven and the arrangement of the gears. In other words, as illustrated in FIG. 10, a direction P2 of a force applied from the conveyance-driving-force transmission section 310 of the pressure base unit 301 to the drive transmitter of the secondary transfer unit 40 is substantially opposite to a direction of a pressing force P1 applied from the pressure base unit 301 to the secondary transfer unit 40.

As described in the above embodiments of the present disclosure described with reference to FIGS. 2 to 7B, the secondary transfer unit 40 does not always form the secondary transfer nip N2 with the intermediate transfer unit 30, and is generally separated from the intermediate transfer unit 30 while being driven. During the separation, the secondary transfer unit 40 may be driven in the separated state by various adjustment operations. In such a case, since the direction of the force P2 applied to the drive transmitted portion of the secondary transfer unit 40 is opposite to the direction of the force P1 by the pressing section 302, the force is applied in the direction in which the pressure base unit 301 (the device including the pressing mechanism that presses the secondary transfer unit) contacts the secondary transfer unit 40. In contrast, in the case where a force is applied in a direction away from the secondary transfer unit 40, as illustrated in FIG. 4B as an example of the above-described embodiments of the present disclosure, although it depends on the method of fixing the secondary transfer unit 40 and the pressing section 302, a force with which the secondary transfer unit 40 moves upward is applied in a state where the secondary transfer unit 40 is only placed from above. In a case of connection by the meshing of gears, a change in an inter-axis distance between gears causes a problem such as abrasion as described above. In the case of connection by joint engagement and the case of connection by gears as embodiments illustrated in FIGS. 8A and 9B, an abnormal sound may be generated in the pressing section 302 in a case where the force turns to be such a force that a gap is generated in the pressing section 302.

As ways for solving the above-described problem, in a case where the drive connection of the secondary transfer unit 40 and the pressing section 302 is performed by meshing of gears, the problem may be solved by adjusting a rotation direction and an arrangement. As specifically illustrated in FIGS. 4B and 10 of the embodiments described above, the force P2 is directed to occur with respect to the secondary transfer unit 40 in a direction opposite the pressing force P1.

In the case of using the joints, there are some difficulties. In such a case, one of the joints has a degree of freedom with respect to the rotation axis and tilting the other joint to reduce the force itself, so that the force itself is lowered and the same effect can be obtained. In the case of the joint connection, when the force turns to such a degree that a gap is generated in the pressing section 302, an abnormal sound may be generated in the pressing section 302. As a way of solving this problem, the rotation direction and arrangement may be changed to solve the problem when gears are used. In FIG. 4B, the force P2 is generated in a direction opposite to the direction in which the pressing force P1 with respect to the secondary transfer unit 40.

The above embodiments and examples of the present disclosure described above substantially include, for example, the following aspects and advantageous effects.

In a first aspect, a pressing device (e.g., the pressing device 300) includes an intermediate transfer unit (e.g., the intermediate transfer unit 30), a secondary transfer unit (e.g., the secondary transfer unit 40), a presser (e.g., the pressing section 302), and a drive transmitter (e.g., the pressing-force transmission section 330, the conveyance-driving-force transmission section 310). The intermediate transfer unit transfers and conveys a toner image. The secondary transfer unit transfers the toner image onto a conveyed material (e.g., the recording material P) at a nip portion (e.g., the secondary transfer nip N2) formed between the intermediate transfer unit and the secondary transfer unit. The presser includes a front pressing lever (e.g., the front pressing lever 361), a rear pressing lever (e.g., the rear pressing lever 362), a front pressing portion (e.g., the front pressing section 371), and a rear pressing portion (e.g., the rear pressing section 372) that press the secondary transfer unit against the intermediate transfer unit at the nip portion. The drive transmitter transmits a driving force and a conveyance driving force to a driven transmitter of the secondary transfer unit. A position of the drive transmitter is restricted by the presser. The drive transmitter is movable together with the presser.

With such a configuration, according to the first aspect, the pressing device in which an operation time does not increase and a service cost does not increase can be provided in, for example, replacement of the secondary transfer unit.

In a second aspect, in the pressing device (e.g., the pressing device 300) according to the first aspect, a relative positional relationship between the secondary transfer unit (e.g., the secondary transfer unit 40) and the presser (e.g., the pressing section 302) does not change regardless of the pressing force.

According to the second aspect, the positional relationship does not change, and then the amount of misalignment of the axial center is stable. Thus, the variation in force with respect to the change in the pressing force is reduced. In the case of coupling with, for example, gears, the pitch between the gears changes as the relative positions of the gears change. A change in the pitch causes, for example, an increase in an abrasion amount of a tooth face of the gear and degradation of rotation accuracy. In the case of connection by coupling, a change in the relative positions of the gears indicates a change in the amount of misalignment in axes. It is known that, even a flexible joint that can absorb the force changes, the force and the direction in which the force is applied change according to the axis displacement amount. An increase in force causes a side effect in which the pressing force changes.

In a third aspect, in the pressing device (e.g., the pressing device 300) according to the first or second aspect, drive connection of the secondary transfer unit (e.g., the secondary transfer unit 40) and the presser (e.g., the pressing section 302) is performed by meshing of gears. With such a configuration, according to the third aspect, a change in an inter-axis distance of gear portions does not cause an inconvenience of such as abrasion. In a case where the force turns to be large enough to generate a gap in the presser, an abnormal sound may be generated in the presser. However, the problem of abnormal sounds can be solved.

In a fourth aspect, in the pressing device (e.g., the pressing device 300) according to the first or second aspect, the drive connection of the secondary transfer unit (e.g., the secondary transfer unit 40) and the presser (e.g., the pressing section 302) is performed by removable joint engagement. With such a configuration, according to the fourth aspect, in a case where the force turns to be large enough to generate a gap in the presser, an abnormal sound may be generated in the presser. However, the problem of abnormal sounds can be solved.

In a fifth aspect, in the pressing device (e.g., the pressing device 300) according to the first, second, or third aspect, a direction of a force (e.g., the force P2) that the secondary transfer unit (e.g., the secondary transfer unit 40) receives from the presser (e.g., the pressing section 302) is substantially opposite to the direction of the force (e.g., the force P1) by the presser (e.g., the pressing section 302).

In a sixth aspect, in the pressing device (e.g., the pressing device 300) according to the fourth aspect, the joint engagement is performed at a plurality of positions between the secondary transfer unit (e.g., the secondary transfer unit 40) and the presser (e.g., the pressing section 302). At least one position of the joint engagement is performed with a gap provided with respect to a rotation shaft that rotates and moves together with the drive transmitter (e.g., the pressing-force transmission section 330, the conveyance-driving-force transmission section 310) and the presser (e.g., the pressing section 302).

In a seventh aspect, in the pressing device (e.g., the pressing device 300) according to any one of the first to sixth aspects, a drive source of the drive transmitter (e.g., the pressing-force transmission section 330, the conveyance-driving-force transmission section 310) that transmits a conveyance driving force is disposed at a location that does not cause a load of the presser (e.g., the pressing section 302). With such a configuration, according to the seventh aspect, the torque to be applied for pressure does not increase, and an environmental load does not increase.

In an eighth aspect, in the pressing device (e.g., the pressing device 300) according to any one of the first to seventh aspects, the presser (e.g., the pressing section 302) is disposed in two (front and rear) positions in a depth direction of the secondary transfer unit (e.g., the secondary transfer unit 40) and includes the presser in at least one position. With such a configuration, according to the eighth aspect, two pressers are disposed so that the front-rear deviation can be adjusted.

In a ninth aspect, an image forming apparatus (e.g., the printer 100) includes the pressing device (e.g., the pressing device 300) according to any one of the first to eighth aspects, the toner image is formed by a secondary transfer process onto the sheet-like recording medium to be conveyed to the nip portion. With such a configuration, according to the ninth aspect, the image forming apparatus that achieves the effect of the pressing device of any one of the first to eighth aspects can be provided.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of the present disclosure. For example, the technical matters described in the above-described embodiments, examples, and modifications may be appropriately combined. For example, the image forming apparatus is not limited to the printer and may be, for example, a copier, a 20) stand-alone fax machine, or a multifunction peripheral including at least two functions of a copier, a printer, a fax machine, and a scanner.

In the above-described embodiments, the image forming apparatus conveys a recording medium P in a horizontal direction in the secondary transfer position (the secondary transfer nip N2). However, embodiments of this disclosure are not limited to the configuration of horizontal conveyance. For example, the present disclosure is applicable to an image forming apparatus that conveys a recording medium P upward, downward, diagonally upward, or diagonally downward in a secondary transfer area. In the above-described embodiments, an object to be conveyed is not limited to the recording medium P like a paper sheet but can be a resin sheet like a prepreg sheet, a paper sheet, a film, or cloth.

The present disclosure is applicable to an apparatus having a mechanism for transferring a toner image onto a conveyed object such as paper after the toner image is formed on a transfer belt.

The base of the present disclosure is a pressing device, and the feature is that a pressing force can be varied. The purpose of varying the pressing force is to optimize transferability according to paper types. The pressing force is applied to the "LEATHAC" paper which has a large paper thickness and a rough face to enhance the transferability.

The effects appropriately described in the above-described embodiments and examples of the present disclosure are merely listing examples of the effects obtained from embodiments of the present disclosure, and the effects according to the present disclosure are not limited to those described in the embodiments and examples of the present disclosure.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A pressing device comprising:
an intermediate transferer to transfer and convey a toner image;
a secondary transferer facing the intermediate transferer to form a nip portion between the secondary transferer and the intermediate transferer, the secondary transferer to transfer the toner image onto a conveyed material at the nip portion;
a presser to apply a pressing force for pressing the secondary transferer to the intermediate transferer at the nip portion; and
a drive transmitter to transmit the pressing force and a conveyance driving force to a driven transmitter of the secondary transferer, the drive transmitter restricted in position by the presser, the drive transmitter movable together with the presser,
wherein relative positions of the secondary transferer and the presser are constant regardless of the pressing force.

2. The pressing device according to claim 1,
wherein drive connection of the secondary transferer and the presser is performed by meshing of gears.

3. The pressing device according to claim 1,
wherein drive connection of the secondary transferer and the presser is performed by removable joint engagement.

4. The pressing device according to claim 3,
wherein the joint engagement is performed at a plurality of positions between the secondary transferer and the presser, and
wherein at least one of the plurality of positions, the joint engagement is performed with a gap from a rotation shaft that rotates and moves together with the drive transmitter and the presser.

5. The pressing device according to claim 1,
wherein a direction of a force that the secondary transferer receives from the presser is substantially opposite to a direction of the pressing force by the presser.

6. The pressing device according to claim 1, wherein a drive source of the drive transmitter that transmits the conveyance driving force is disposed at a location at which the drive source applies no load to the presser.

7. The pressing device according to claim 1, wherein the presser is disposed at a front position and a rear position with respect to the secondary transferer in a depth direction of the pressing device and includes the presser in at least one position.

8. An image forming apparatus comprising the pressing device according to claim 1, wherein the secondary transferer transfers the toner image onto the conveyed material conveyed to the nip portion, to form the toner image on the conveyed material.

9. A pressing device comprising:

an intermediate transferer to transfer and convey a toner image;

a secondary transferer facing the intermediate transferer to form a nip portion between the secondary transferer and the intermediate transferer, the secondary transferer to transfer the toner image onto a conveyed material at the nip portion;

a presser to apply a pressing force for pressing the secondary transferer to the intermediate transferer at the nip portion; and a drive transmitter to transmit the pressing force and a conveyance driving force to a driven transmitter of the secondary transferer, the drive transmitter restricted in position by the presser, the drive transmitter movable together with the presser, wherein drive connection of the secondary transferer and the presser is performed by meshing of gears.

10. The pressing device according to claim 9, wherein a direction of a force that the secondary transferer receives from the presser is substantially opposite to a direction of the pressing force by the presser.

11. The pressing device according to claim 9, wherein a drive source of the drive transmitter that transmits the conveyance driving force is disposed at a location at which the drive source applies no load to the presser.

12. The pressing device according to claim 9, wherein the presser is disposed at a front position and a rear position with respect to the secondary transferer in a depth direction of the pressing device and includes the presser in at least one position.

13. An image forming apparatus comprising the pressing device according to claim 9, wherein the secondary transferer transfers the toner image onto the conveyed material conveyed to the nip portion, to form the toner image on the conveyed material.

14. A pressing device comprising:

an intermediate transferer to transfer and convey a toner image;

a secondary transferer facing the intermediate transferer to form a nip portion between the secondary transferer and the intermediate transferer, the secondary transferer to transfer the toner image onto a conveyed material at the nip portion;

a presser to apply a pressing force for pressing the secondary transferer to the intermediate transferer at the nip portion; and a drive transmitter to transmit the pressing force and a conveyance driving force to a driven transmitter of the secondary transferer, the drive transmitter restricted in position by the presser, the drive transmitter movable together with the presser, wherein the presser is disposed at a front position and a rear position with respect to the secondary transferer in a depth direction of the pressing device and includes the presser in at least one position.

15. The pressing device according to claim 14, wherein drive connection of the secondary transferer and the presser is performed by removable joint engagement.

16. The pressing device according to claim 15, wherein the joint engagement is performed at a plurality of positions between the secondary transferer and the presser, and wherein at least one of the plurality of positions, the joint engagement is performed with a gap from a rotation shaft that rotates and moves together with the drive transmitter and the presser.

17. The pressing device according to claim 14, wherein a direction of a force that the secondary transferer receives from the presser is substantially opposite to a direction of the pressing force by the presser.

18. The pressing device according to claim 14, wherein a drive source of the drive transmitter that transmits the conveyance driving force is disposed at a location at which the drive source applies no load to the presser.

19. An image forming apparatus comprising the pressing device according to claim 14, wherein the secondary transferer transfers the toner image onto the conveyed material conveyed to the nip portion, to form the toner image on the conveyed material.

* * * * *